(12) United States Patent
Ohhashi

(10) Patent No.: US 7,561,507 B2
(45) Date of Patent: Jul. 14, 2009

(54) INFORMATION RECORDING AND REPRODUCING APPARATUS

(75) Inventor: Naoya Ohhashi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 661 days.

(21) Appl. No.: 11/370,912

(22) Filed: Mar. 9, 2006

(65) Prior Publication Data

US 2006/0203694 A1 Sep. 14, 2006

(30) Foreign Application Priority Data

Mar. 10, 2005 (JP) .............................. 2005-068188

(51) Int. Cl.
*G11B 19/00* (2006.01)
*G11B 5/00* (2006.01)

(52) U.S. Cl. .................................................. 369/47.5

(58) Field of Classification Search ................. None
See application file for complete search history.

(56) References Cited

U.S. PATENT DOCUMENTS

| | | | | | |
|---|---|---|---|---|---|
| 4,636,702 | A | * | 1/1987 | Hedges | 318/729 |
| 7,142,486 | B2 | * | 11/2006 | Masui et al. | 369/44.29 |
| 7,423,940 | B2 | * | 9/2008 | Masui et al. | 369/44.29 |
| 2002/0085470 | A1 | * | 7/2002 | Yokoi | 369/59.11 |
| 2002/0196717 | A1 | * | 12/2002 | Masui et al. | 369/44.29 |
| 2003/0053389 | A1 | * | 3/2003 | Mashimo | 369/59.11 |
| 2003/0202443 | A1 | | 10/2003 | Nakagawa et al. | |
| 2005/0259549 | A1 | * | 11/2005 | Yokoi | 369/59.11 |
| 2005/0265182 | A1 | * | 12/2005 | Liu et al. | 369/47.53 |
| 2006/0215246 | A1 | * | 9/2006 | Kerekes et al. | 359/201 |

FOREIGN PATENT DOCUMENTS

| | | |
|---|---|---|
| JP | 09-288827 | 11/1997 |
| JP | 2001-307327 | 11/2001 |
| JP | 2002-170269 | 6/2002 |
| JP | 2004-022069 | 1/2004 |
| JP | 2004-110962 | 4/2004 |
| JP | 2004-288331 | 10/2004 |
| JP | 2004-310481 | 11/2004 |
| JP | 2005-004855 | 1/2005 |
| WO | WO 2004/102557 A2 | 11/2004 |

* cited by examiner

*Primary Examiner*—Joseph H Feild
*Assistant Examiner*—Parul Gupta
(74) *Attorney, Agent, or Firm*—Dickstein Shapiro LLP

(57) ABSTRACT

An information recording and reproducing apparatus is disclosed. The apparatus includes a running power controlling and recording unit and an interval adjusting unit which adjusts an interval for performing running power control and makes a suitable ROPC operation possible even if conditions for recording information are changed. When data recording is started, it is determined whether an ROPC operation is to be performed. When the ROPC operation is not to be performed, it is determined whether the data recording is finished, and when the data recording is finished, the operation ends. When it is determined to perform the ROPC operation, the ROPC operation is performed, and it is determined whether interval for performing the ROPC operation is to be changed. When it is determined to change the interval for performing the ROPC operation, the interval for performing the ROPC operation is changed.

5 Claims, 6 Drawing Sheets

INFORMATION RECORDING AND REPRODUCING APPARATUS

BACKGROUND OF THE INVENTION

1. Field of the Invention

The present invention generally relates to an information recording and reproducing apparatus in which power is controlled when information is being recorded in an information recording medium.

2. Description of the Related Art

As a recording medium capable of recording a large amount of information, there are a CD-R and a CD-RW. Recently, as a recording medium capable of recording a much larger amount of information, a DVD+R and a DVD+RW have been replacing the CD-R and the CD-RW in the market place. When information is recorded in these media, a driver performs an operation called OPC (optimum power control & calibration). In the OPC operation, test writing is performed in a test writing zone by changing laser power in several steps; then, optimum power is determined. This test writing zone is called a PCA (power calibration area) in the CD-R and the CD-RW, inner and outer disc test zones in the DVD+R, and inner and outer drive test zones in the DVD+RW.

In addition to the OPC operation, as a typical power control method, there is an ROPC (running OPC) operation. In the ROPC operation, the disc status during recording of information is always monitored and recording is performed by controlling power. Recently, recording speeds have become high and 16 times standard recording speed can be performed in the DVD+R and the DVD+RW.

As a conventional technology, Patent Document 1 aims to form an excellent recording mark, even if optimum recording power is changed by differences of recording sensitivity among discs or difference of ambient temperature. In order to achieve this, an information recording apparatus, which forms an information recording mark by irradiating an optical beam onto a disc, is disclosed. The information recording apparatus includes a test writing unit which performs test writing by changing recording power of an optical beam and a rotational speed deciding unit which determines the rotational speed at the time of recording information by using the test writing results.

[Patent Document 1] Japanese Laid-Open Patent Application No. 9-288827

However, in the case of the above high-speed recording, even if information is recorded under optimum conditions by the ROPC operation in the inner small radius region and the middle medium radius region of a disc, with those same conditions, the information cannot be recorded optimally in the outer large radius region and near the outer region. Consequently, in some cases, recording quality is degraded. These problems are caused by ambient temperature, bowing of the disc, mechanical characteristics of the apparatus, and so on. In this case, higher recording power is required than usual; therefore, the usual power is supplemented by the ROPC operation. However, in the case of the high 16-times recording speed, this supplement is not applied in time, so that the difference in the recording power cannot be compensated for. Consequently, recording quality is degraded and recorded data cannot be read.

In the technology described in Patent Document 1, test writing is performed before usual recording and the rotational speed is controlled according to the results of the test writing when the usual recording is performed. However, as described above, since it is not taken into consideration that the recording power is influenced by the bowing of the disc and the mechanical characteristics of the apparatus, the correction cannot be applied in time due to high-speed recording.

SUMMARY OF THE INVENTION

In a preferred embodiment of the present invention, there is provided an information recording and reproducing apparatus which can perform a suitable OPC operation even if a recording position, a recording speed, recording quality, and a value corresponding to a reproduced signal are changed, by providing a running power controlling and recording unit and an interval adjusting unit which adjusts an interval at which running optimum power control is performed by the running power controlling and recording unit.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by an information recording and reproducing apparatus particularly pointed out in the specification in such full, clear, concise, and exact terms as to enable a person having ordinary skill in the art to practice the invention.

To achieve these and other advantages in accordance with the purpose of the present invention, according to one aspect of the present invention, there is provided an information recording and reproducing apparatus. The information recording and reproducing apparatus, which records information in an information recording medium and reproduces the information recorded in the information recording medium, includes a running power controlling and recording unit which records the information in the information recording medium while always monitoring a status of the information recording medium while recording the information and by controlling recording power, an interval adjusting unit which adjusts an interval for performing running power control by the running power controlling and recording unit, and a control unit which controls the running power controlling and recording unit and the interval adjusting unit. The control unit determines whether the running power controlling and recording unit is to perform based on conditions for recording the information in the information recording medium, and when the control unit determines that the running power controlling and recording unit is to perform, the control unit informs the interval adjusting unit of an interval value for performing the running power control.

Specifically, the information recording and reproducing apparatus according to the present invention includes a running power controlling and recording unit which records information in the information recording medium while always monitoring a status of the information recording medium (disc) during recording of the information and by performing running power control (ROPC operation) while controlling the recording power, an interval adjusting unit which adjusts an interval for performing the running power control (ROPC operation), and a control unit which controls the above two units.

According to another aspect of the present invention, when the control unit commands the running power controlling and recording unit to perform the running power control in an entire area of the information recording medium, the control unit controls the interval adjusting unit so that the running power control is performed at different intervals for an inner region and an outer region of the information recording medium.

In a conventional ROPC operation, when the ROPC operation is performed on the entire face (recording area) of the information recording medium, correction by the ROPC operation is effective in the inner small radius and middle medium radius regions. In some cases, the correction is not applied in time in the outer large radius region due to high-speed recording. Therefore, according to the embodiment of the present invention, when the ROPC operation is performed on the entire face of the information recording medium, the ROPC operation is performed by using different intervals for in the inner small radius region and the outer large radius region.

According to another aspect of the present invention, when the control unit commands the running power controlling and recording unit to perform the running power control in the entire area of the information recording medium, the control unit controls the interval adjusting unit so that the interval for performing the running power control in the outer region of the information recording medium is smaller than the interval in the inner region thereof.

In the ROPC operation, when an interval for performing the ROPC operation is made small, the BLER is lowered. In addition, in a case of high-speed recording, when the ROPC is performed, suitable recording can be performed in the inner and middle regions; but, in some cases, suitable recording cannot be performed in the outer region. In order to solve this problem, the performing interval in the outer region is made smaller than that in the inner region. With this, the error rate in the outer region can be lowered.

According to another aspect of the present invention, when the control unit commands the running power controlling and recording unit to perform the running power control in a region of the information recording medium, the control unit controls the interval adjusting unit so that the running power control is performed only in the outer region of the information recording medium.

In a case of high-speed recording, when the ROPC operation is performed with a constant performing interval, the nearer to the outer large radius region the recording position reaches, the higher the BLER becomes. However, since the BLER is not large in the inner small radius region, when the ROPC is partially performed, the BLER can be maintained in an excellent state in all regions. Therefore, according to the embodiment of the present invention, the ROPC operation is performed only in the outer large radius region where the BLER is to be lowered.

According to another aspect of the present invention, the conditions for recording the information in the information recording medium are an information recording position, a recording speed, recording quality, a value corresponding to a reproduced signal, and recording time.

The interval for performing the ROPC operation is changed depending on the recording position of information recording in the information recording medium. For example, the ROPC operation is performed until the middle of the disc, or the interval for performing the ROPC operation is changed until the middle of the disc. It is not necessary that the interval for performing the ROPC operation is changed in 4-times or 8-times low-speed recording. However, the interval for performing the ROPC operation is changed in 16-times high-speed recording. Basically, the ROPC operation is to control $\beta$ to a predetermined reference value. $\beta$ can be obtained from a reproduced RF signal. Generally, when $\beta$ is greater than a reference value, the recording power is high, and when $\beta$ is smaller than the reference value, the recording power is insufficient. In addition, in the ROPC operation, generally, the recording power is corrected from a position where recording has most recently been performed. At this time, recording quality is measured; when the recording quality is not good, the interval of the ROPC operation is made smaller. When a predetermined time has passed after starting the recording, the recording position at that time can be obtained. That is, by monitoring the recording time, it can be determined when an interval for confirming the recording status (the interval for performing the ROPC operation) is changed.

Effect of the Invention

According to an embodiment of the present invention, the control unit determines whether the running power controlling and recording unit is to perform based on conditions for recording information in the information recording medium, and gives the interval adjusting unit an interval for performing the running power control. Therefore, even when high-speed recording is performed, a suitable ROPC operation can be performed on the entire face of the information recording medium.

In addition, when the ROPC operation is performed on the entire recording area of the information recording medium, the ROPC operation is performed with different intervals in the inner small radius region and the outer large radius region of the information recording medium. Therefore, a discrepancy of correction among recording positions can be lowered.

In addition, since the interval for performing the ROPC operation in the outer large radius region is made smaller than that in the inner small radius region, the error rate in the outer large radius region is lowered and recording quality is improved.

When the ROPC operation is performed only in the outer large radius region in order to lower the error rate, carrying out an unnecessary ROPC operation can be prevented and the entire recording speed can be made high.

The conditions for recording information in the information recording medium are an information recording position, a recording speed, recording quality, a value corresponding to a reproduced signal, and recording time. Therefore, a suitable ROPC operation that meets the conditions can be selected.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENT

Best Mode of Carrying Out the Invention

The best mode of carrying out the present invention is described with reference to the accompanying drawings. In the description of the preferred embodiment, the embodiment of the present invention is not limited to specifically described structural elements, types, combinations, shapes, or disposition thereof, and those can be changed or modified without departing from the scope of the embodiment.

Figure 1:
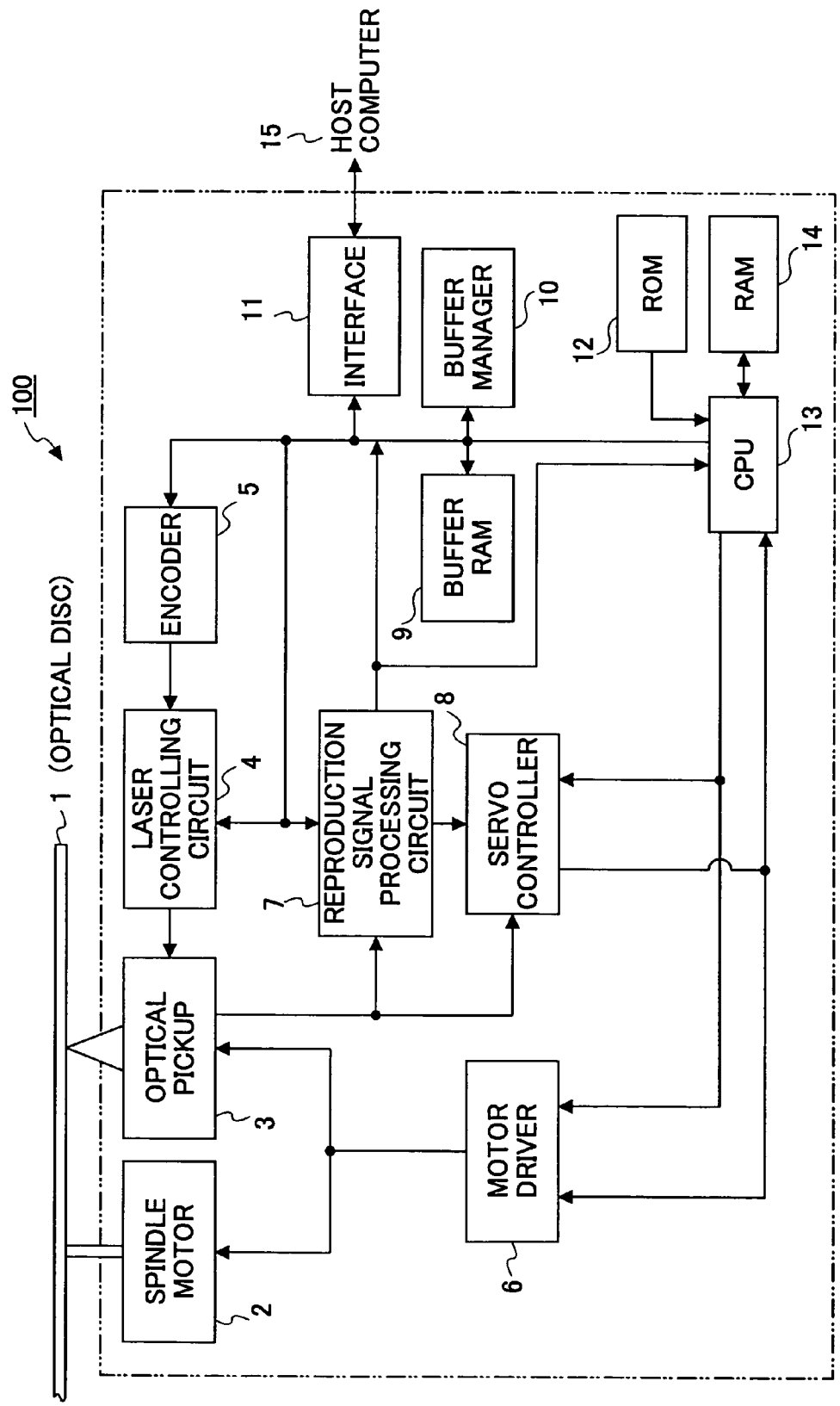
FIG. 1 a block diagram showing an information recording and reproducing apparatus according to an embodiment of the present invention.

FIG. 1 a block diagram showing an information recording and reproducing apparatus according to an embodiment of the present invention. As the information recording and reproducing apparatus, a DVD+R drive is used as an example in the explanation. As shown in FIG. 1, an information recording and reproducing apparatus 100 includes a spindle motor 2, an optical pickup 3, a laser controlling circuit 4, an encoder 5, a motor driver 6, a reproduction signal processing circuit 7, a servo controller 8, a buffer RAM 9, a buffer manager 10, an interface 11, a ROM 12, a CPU 13, and a RAM 14. The spindle motor 2 rotatably drives an optical disc 1 that is an information recording medium. The optical pickup 3 irradiates a laser beam onto a recording face of the optical disc 1 in which tracks (recording regions) of a spiral shape or a concentric circle shape are formed and receives light reflected from the recording face of the optical disc 1. The laser controlling circuit 4 controls an output of the laser beam irradiating from the optical pickup 3 based on a writing signal from the encoder 5 and an instruction from the CPU 13. The encoder 5 takes out data being stored in the buffer RAM 9 via the buffer manager 10 based on an instruction from the CPU 13, applies data modulation to the data and adds an error correction code to the data, generates a writing signal for the optical disc 1, and outputs the writing signal to the laser controlling circuit 4 synchronizing with a synchronizing signal from the reproduction signal processing circuit 7. The motor driver 6 drives a tracking actuator and a focusing actuator of the optical pickup 3 corresponding to control signals from the servo controller 8. The reproduction signal processing circuit 7 detects a wobble signal, an RF signal, servo signals (focus error signal and track error signal), and so on, based on a signal output from the optical pickup 3. The servo controller 8 generates a control signal for correcting a focus shift based on the focus error signal from the reproduction signal processing circuit 7 and generates a control signal for correcting a track shift based on the track error signal from the reproduction signal processing circuit 7. The buffer RAM 9 is a buffer memory. The buffer manager 10 manages data input and output to/from the buffer RAM 9 and informs the CPU 13 when the amount of data stored in the buffer RAM 9 becomes a predetermined value. The interface 11 is a two-way communication interface with a host computer 15 (for example, a personal computer). The ROM 12 stores a program, written using codes readable by the CPU 13, which records data in the optical disc 1 corresponding to a recording request from the host computer 15. The CPU 13 controls all the elements in the information recording and reproducing apparatus 100. The RAM 14 is a working memory. In FIG. 1, arrows show flows of typical signals and information and do not entirely show the connection relationships among the structural elements. In the embodiment of the present invention, as the optical disc 1, an information recording medium in compliance with the DVD+RW standard is used.

The optical pickup 3 includes a semiconductor laser as a light source, an optical system which guides a light flux output from the semiconductor laser onto the recording face of the optical disc 1 and guides a return light flux reflected from the recording face to a predetermined light receiving position, a light receptor which is located at the light receiving position and receives the return light flux, and a driving system including the focusing actuator, the tracking actuator, and a seek motor. These are not shown in FIG. 1. A signal corresponding to the amount of received light is output from the light receptor to the reproduction signal processing circuit 7.

The reproduction signal processing circuit 7 extracts ADIP (address in pre-groove) information, a synchronizing signal, and so on from a detected wobble signal, and outputs the ADIP information to the CPU 13 and outputs the synchronizing signal to the encoder 5. Further, the reproduction signal processing circuit 7 forms reproduction data by applying a decoding process and an error correcting process to a detected RF signal and stores the reproduction data in the buffer RAM 9 via the buffer manager 10. In this, an error rate generated in the decoding process is reported to the CPU 13. A detected servo signal is output to the servo controller 8.

Various control signals generated by the servo controller 8 are output to the motor driver 6.

The motor driver 6 performs tracking control and focus control with the reproduction signal processing circuit 7 and the servo controller 8. In addition, the motor driver 6 drives the spindle motor 2 and the seek motor in the optical pickup 3 based on an instruction from the CPU 13.

The interface 11 is a standard interface in compliance with the ATAPI (AT attachment packet interface), the SCSI (small computer system interface), the USB (universal serial bus), and so on.

Next, a data recording process is explained. First, a control signal for controlling the rotational speed of the spindle motor 2 is output to the motor driver 6 based on the recording speed, and an instruction to store user data received from the host computer 15 in the buffer RAM 9 is given to the buffer manager 9. Information that a recording request command is received from the host computer 15 is sent to the reproduction signal processing circuit 7. When the optical disc 1 reaches a predetermined linear velocity, tracking control and focus control are performed. The tracking control and the focus control are performed at any time until the recording process ends. When information that the amount of the user data stored in the buffer RAM 9 exceeds a predetermined amount is received from the buffer manager 10, the encoder 5 is instructed to generate a writing signal. When the optical pickup 3 reaches a writing start point, this information is sent to the encoder 5. With this, the user data are written in the optical disc 1 via the encoder 5, the laser controlling circuit 4, and the optical pickup 3. When all user data from the host computer 15 are written in the optical disc 1, the recording process ends.

Next, a data reproducing process is explained. First, a control signal for controlling the rotational speed of the spindle motor 2 is output to the motor driver 6 based on the reproducing speed, and information that a reproducing request command is received from the host computer 15 is sent to the reproduction signal processing circuit 7. When the optical disc 1 reaches a predetermined linear velocity, tracking control and focus control are performed. The tracking control and the focus control are performed at any time until the reproducing process ends. When the optical pickup 3 reaches a reading start point, this information is sent to the reproduction signal processing circuit 7. With this, reproduction data are stored in the buffer RAM 9 via the reproduction signal processing circuit 7. When the reproduction data are integrated into sector data, the sector data are sent to the host computer 15 from the buffer RAM 9 via the interface 11 by an instruction from the buffer manager 10. When all data are reproduced as instructed by the host computer 15, the reproducing process ends.

Figure 2:
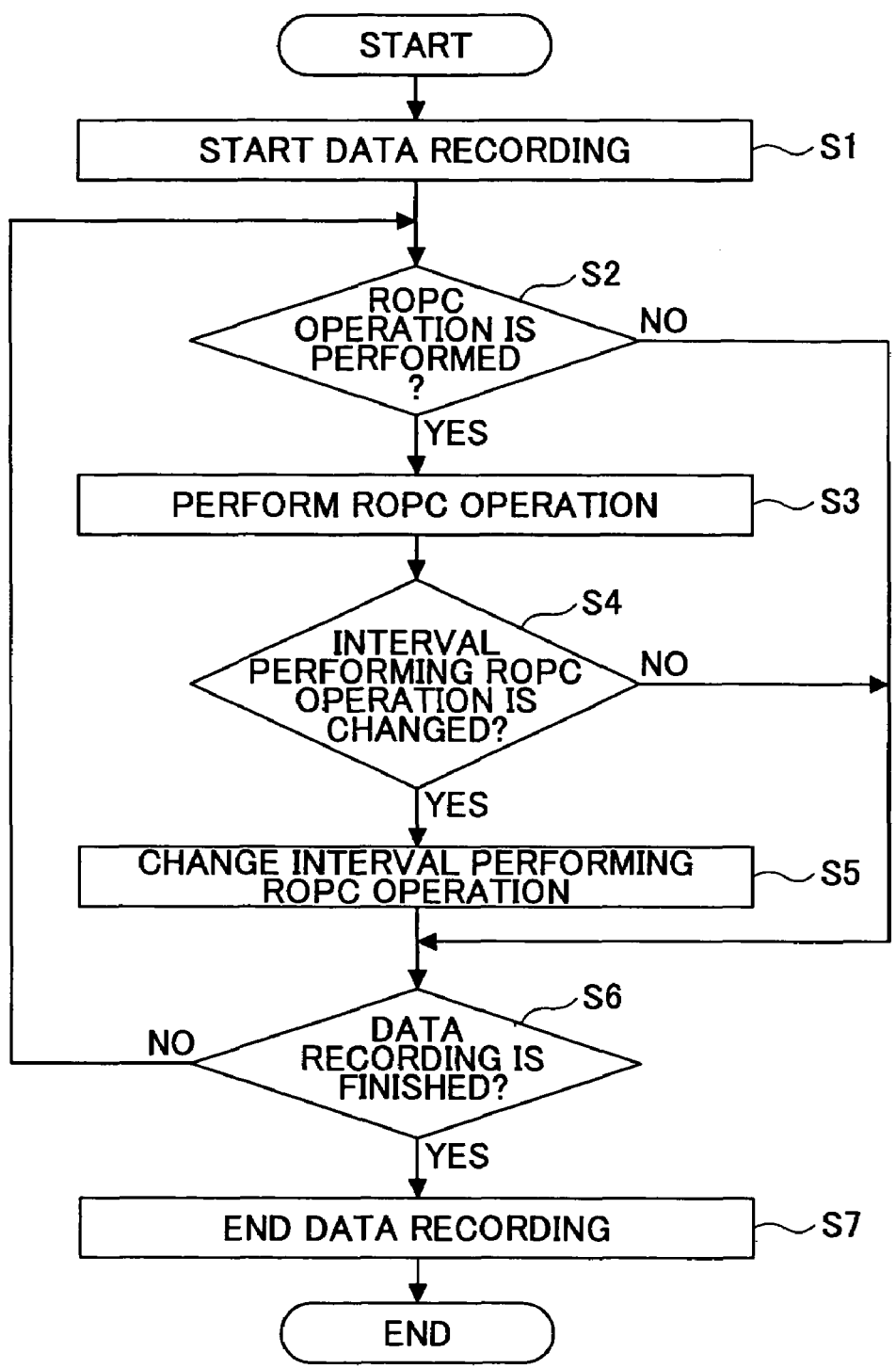
FIG. 2 is a flowchart showing an operation of the information recording and reproducing apparatus according to the embodiment of the present invention.

FIG. 2 is a flowchart showing an operation of the information recording and reproducing apparatus according to the embodiment of the present invention. Referring to FIG. 2, the operation is explained. First, data recording is started (step S1). Next, it is determined whether an ROPC operation is to be performed (step S2). When the ROPC operation is not to be performed (No in step S2), it is determined whether the data recording is finished (step S6). When the data recording is finished (Yes in step S6), the data recording ends (step S7). When the data recording is not finished (No in step S6), the operation returns to step S2. When it is determined that the ROPC operation is to be performed (Yes in step S2), the ROPC operation is performed (step S3). Next, it is determined whether an interval for performing the ROPC operation is to be changed (step S4). When it is determined that the interval for performing the ROPC operation is not to be changed (No in step S4), the operation goes to step S6. When it is determined that the interval for performing the ROPC operation is to be changed (Yes in step S4), the interval for performing the ROPC operation is changed (step S5). Next, it is determined whether the data recording is finished (step S6). When the data recording is finished (Yes in step S6), the data recording ends (step S7). When the data recording is not finished (No in step S6), the operation returns to step S2.

The information recording and reproducing apparatus 100 according to the embodiment of the present invention includes a running power controlling and recording unit which records information in the optical disc 1 by always monitoring the disc status while recording information and by performing the running optimum power controlling operation, an interval adjusting unit which adjusts an interval for performing the running optimum power controlling operation, and a control unit which controls the running power controlling and recording unit and the interval adjusting unit. The control unit determines whether the running power controlling operation (ROPC) is to be performed based on conditions (for example, recording position, recording speed, and so on) of recording information in the optical disc 1, and when the running power controlling operation (ROPC) is performed, an interval for performing the running power control is suitably adjusted.

Figure 3A:
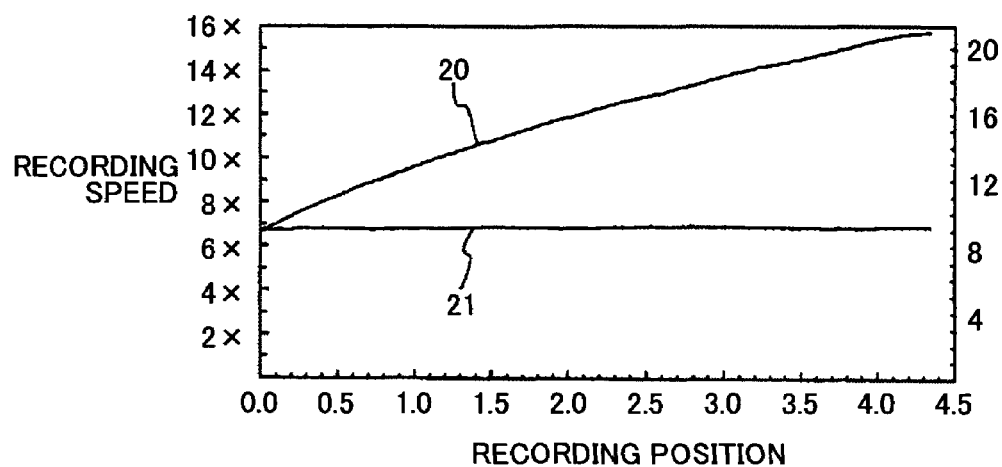
FIG. 3A is a graph showing a relationship between a recording speed and a recording position of an optical disc when 16-times CAV (constant angular velocity) recording is performed in a DVD+R without performing an ROPC operation.

FIG. 3A is a graph showing a relationship between a recording speed and a recording position of an optical disc when 16-times CAV (constant angular velocity) recording is performed in a DVD+R without performing the ROPC operation. In FIG. 3A, the vertical axis shows the recording speed and the horizontal axis shows the recording position in the optical disc. Further in FIG. 3A, the numeral 20 shows a current recording speed and the numeral 21 shows the rotational speed of the optical disc at the CAV recording (the rotational speed is a constant due to the CAV recording).

Figure 3B:
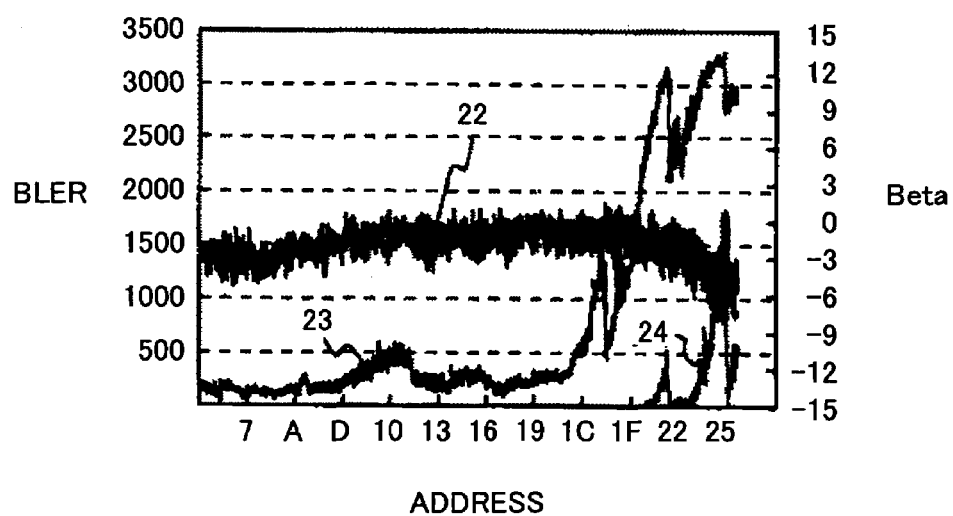
FIG. 3B is a graph showing a relationship between an address of the optical disc and a BLER (block error rate) in the case shown in FIG. 3A.

FIG. 3B is a graph showing a relationship between an address of an optical disc and a BLER (block error rate) in the case shown in FIG. 3A. The BLER shows an error rate in an ECC (error correcting code) unit. In FIG. 3B, the vertical axis shows the BLER and β and the horizontal axis shows a physical address of the optical disc. β is a basic value at the ROPC operation and can be obtained from a reproduced RF signal. Generally, when β is greater than a reference value, the recording power is high, and when β is smaller than the reference value, the recording power is insufficient. In FIG. 3B, the numeral 22 shows β, the numeral 23 shows PI (parity inner), and the numeral 24 shows POF (parity outer fail). In the error correction in DVD, a double correction in the row and the column is performed in the ECC unit. First, a correction in a column is performed (PI correction); when the correction is not enough, a correction in a row is performed (PO correction). When the PI and PO corrections are not enough, a remaining error becomes POF. As shown in FIG. 3B, the PI error (the numeral 23) is increasing in the outer longer radius direction, and finally, the POF (the numeral 24) is generated. This means that the recording quality of this optical disc is not excellent.

Figure 4A:
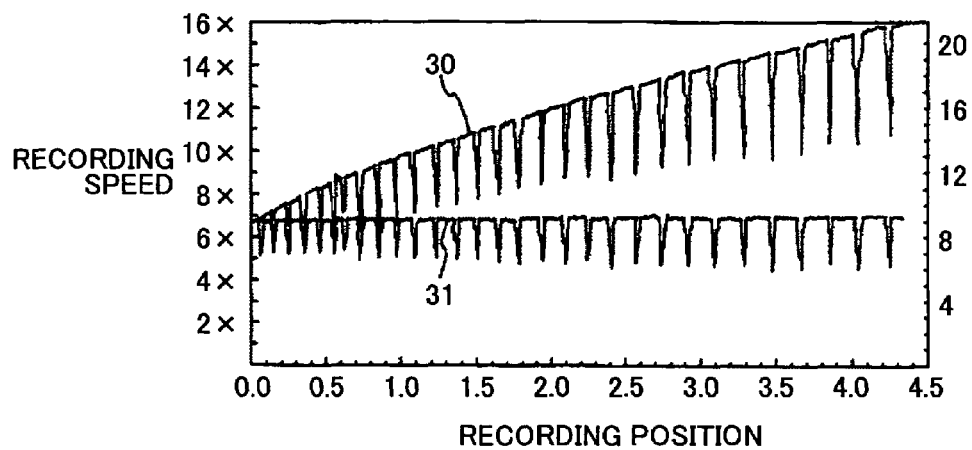
FIG. 4A is a graph showing a relationship between the recording speed and the recording position of the optical disc when the ROPC operation is applied to the entire face of the optical disc.

FIG. 4A is a graph showing a relationship between the recording speed and the recording position of the optical disc when the ROPC operation is applied to the entire face of the optical disc. In FIG. 4A, the CAV recording is applied, and the numeral 30 shows a current recording speed and the numeral 31 shows the rotational speed of the optical disc at the CAV recording (the rotational speed is a constant due to the CAV recording). However, in the ROPC operation, in order to measure β at a position where recording has most recently been performed, the writing operation is temporarily stopped. Consequently, notches are formed with a constant interval in the graph (waveform) of the recording speed. In this case, the ROPC operation is performed with an interval of 10 seconds.

Figure 4B:
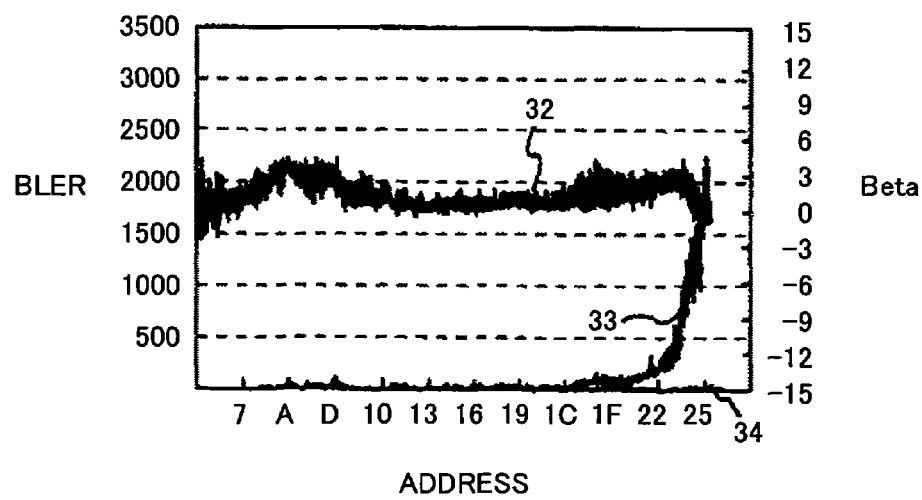
FIG. 4B is a graph showing a relationship between the address of the optical disc and the BLER when the ROPC operation is applied to the entire face of the optical disc.

FIG. 4B is a graph showing a relationship between the address of the optical disc and the BLER when the ROPC operation is applied to the entire face of the optical disc. As described above, the BLER shows an error rate in an ECC unit. In FIG. 4B, the vertical axis shows the BLER and β and the horizontal axis shows a physical address of the optical disc. In FIG. 4B, the numeral 32 shows β, the numeral 33 shows PI, and the numeral 34 shows POF. When FIG. 4B is compared with FIG. 3B, in FIG. 4B, the PI error is low in the inner small radius region and the middle medium radius region, but the BLER of PI error is high in the outer large radius region. The ROPC operation every 10 seconds can correct the recording power in the inner small radius region and the middle medium radius region; however, the correction is not applied in time in the outer large radius region. Consequently, the BLER (PI error) becomes high in the outer large radius region.

Figure 5A:
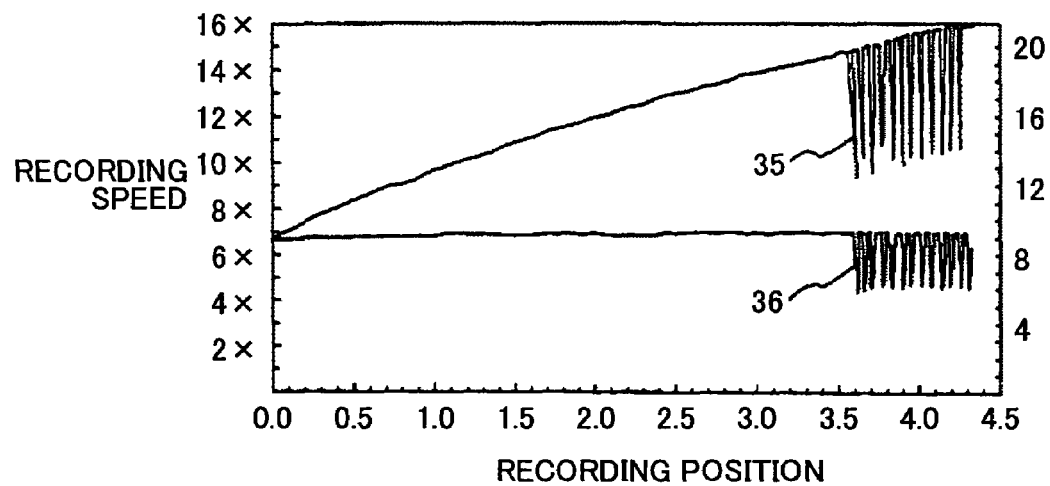
FIG. 5A is a graph showing a relationship between the recording speed and the recording position of the optical disc when the ROPC operation is applied to the outer large radius region of the optical disc.

FIG. 5A is a graph showing a relationship between the recording speed and the recording position of the optical disc when the ROPC operation is applied to the outer large radius region of the optical disc. In FIG. 5A, the CAV recording is applied, and the numeral 35 shows a current recording speed and the numeral 36 shows the rotational speed of the optical disc at the CAV recording (the rotational speed is a constant due to the CAV recording). However, in the ROPC operation, in order to measure β at a position where recording has most recently been performed, the writing operation is temporarily stopped. Consequently, notches are formed with a constant interval in the graph of the recording speed in the outer large radius region. In this, the ROPC operation is performed with an interval of 3 seconds.

Figure 5B:
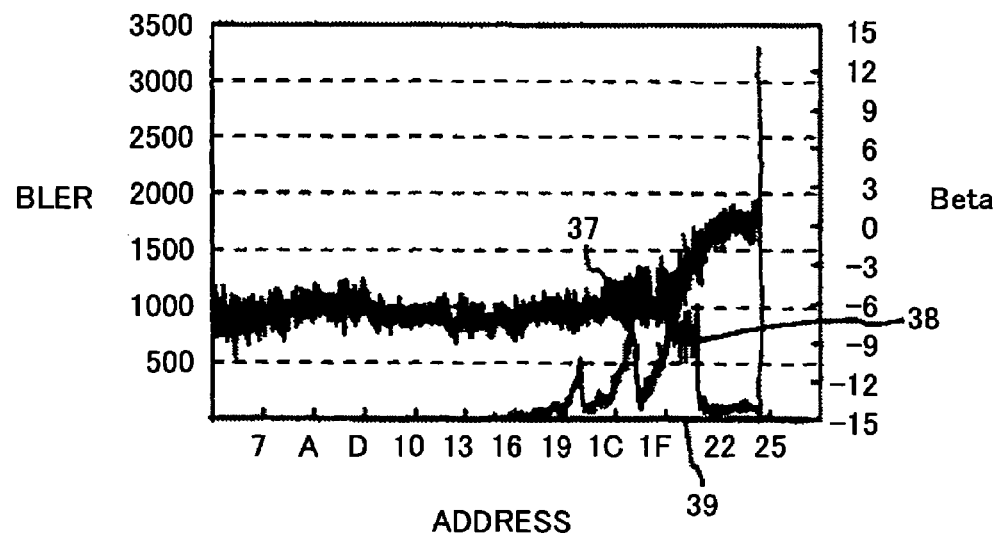
FIG. 5B is a graph showing a relationship between the address of the optical disc and the BLER when the ROPC operation is applied to the outer large radius region of the optical disc.

FIG. 5B is a graph showing a relationship between the address of the optical disc and the BLER when the ROPC operation is applied to the outer large radius region of the optical disc. As described above, the BLER shows an error rate in an ECC unit. In FIG. 5B, the vertical axis shows the BLER and β and the horizontal axis shows a physical address of the optical disc. In FIG. 5B, the numeral 37 shows β, the numeral 38 shows PI, and the numeral 39 shows POF. When FIG. 5B is compared with FIG. 3B, in FIG. 5B, the BLER is low in the outer large radius region and also the POF is not generated.

In a case of high-speed recording, when the ROPC operation is performed with a constant interval, the nearer to the outer large radius region the recording position reaches, the higher the BLER becomes. However, since the BLER is not large in the inner small radius region, when the ROPC is partially performed, the entire BLER can be maintained at a low level. Therefore, in the embodiment of the present invention, the ROPC operation is performed in only the outer large radius region where the BLER becomes high. With this, unnecessary ROCP operations are not performed and the entire recording speed can be made high.

Figure 6A:
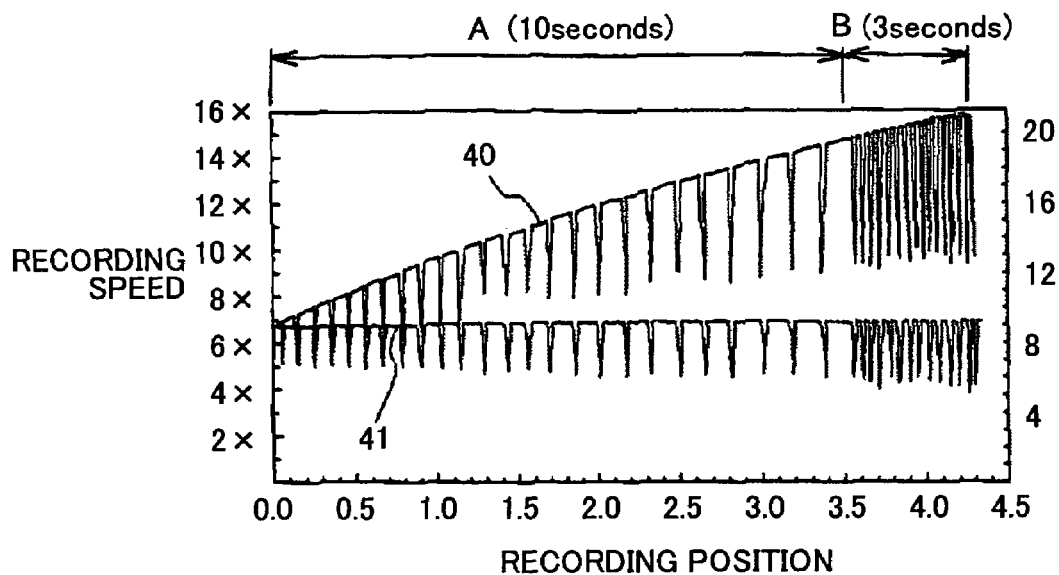
FIG. 6A is a graph showing a relationship between the recording speed and the recording position of the optical disc when the ROPC operation is applied to the entire face in which an interval for performing the ROPC operation is different between a region A and a region B.

FIG. 6A is a graph showing a relationship between the recording speed and the recording position of the optical disc when the ROPC operation is applied to the entire face in which an interval for performing the ROPC operation is different between region A and region B. The interval of the ROPC operation is 3 seconds in region B where LBA (logical block address) is on 0x1D0000h and higher and 10 seconds in region A before the region B.

Figure 6B:
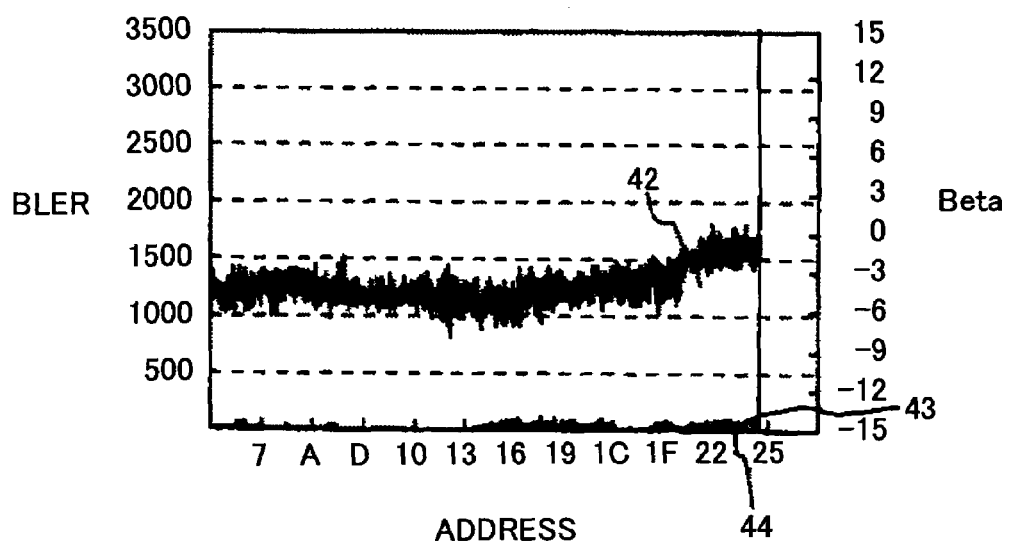
FIG. 6B is a graph showing a relationship between the address of the optical disc and the BLER in the case shown in FIG. 6A.

FIG. 6B is a graph showing a relationship between the address of the optical disc and the BLER in the case shown in FIG. 6A. As described above, in FIG. 6B, the vertical axis shows the BLER and β and the horizontal axis shows a physical address of the optical disc. In FIG. 6B, the numeral 42 shows β, the numeral 43 shows PI, and the numeral 44 shows POF. When FIG. 6B is compared with FIG. 3B, in FIG. 6B, the BLER of the PI error is extremely low in the entire recording area and the increase of the BLER cannot be seen in the outer large radius region.

As described above, when ON or OFF of the ROPC operation and the change of the interval for performing the ROPC operation are carried out, the recording quality can be improved compared with a conventional ROPC operation. In this, the recording speed, the region for applying the ROPC operation, and the interval of time are not limited to the above. For example, when the interval for performing the ROPC operation is changed after 6 minutes of a start of recording, in a case of 16-times recording, graphs similar to FIGS. 6A and 6B can be obtained.

In a conventional ROPC operation, when the ROPC operation is performed on the entire face of an optical disc, correction by the ROPC operation is effective in the inner small radius region and the middle medium radius region, but in some cases, the correction cannot be met in the outer large radius region due to high-speed recording.

According to the embodiment of the present invention, when the ROPC operation is performed on the entire face of the optical disc, the ROPC operation is performed by using an interval in the outer large radius region different from an interval in the inner small radius and middle medium radius regions. In the embodiment of the present invention, the interval in the outer large radius region is 3 seconds, which is less than that (10 seconds) in the inner small radius and middle medium radius regions. With this, the BLER in the outer large radius region is lowered. Therefore, recording quality can be improved by lowering the error rate in the outer large radius region.

Further, the present invention is not limited to the specifically disclosed embodiment, and variations and modifications may be made without departing from the scope of the present invention.

The present invention is based on Japanese Priority Patent Application No. 2005-068188, filed on Mar. 10, 2005, with the Japanese Patent Office, the entire contents of which are hereby incorporated by reference.

What is claimed is:

1. An information recording and reproducing apparatus, which records information in an information recording medium and reproduces the information recorded in the information recording medium, comprising:

a running power controlling and recording unit which records the information in the information recording medium while always monitoring a status of the information recording medium while recording the information and by controlling recording power;

an interval adjusting unit which adjusts an interval for performing running power control by the running power controlling and recording unit; and a control unit which controls the running power controlling and recording unit and the interval adjusting unit; wherein the control unit determines whether the running power controlling and recording unit is to perform based on conditions for recording the information in the information recording medium, and when the control unit determines that the running power controlling and recording unit is to perform, the control unit informs the interval adjusting unit of an interval value for performing the running power control.

2. The information recording and reproducing apparatus as claimed in claim 1, wherein:

when the control unit commands the running power controlling and recording unit to perform the running power control in an entire area of the information recording medium, the control unit controls the interval adjusting unit so that the running power control is performed at different intervals for an inner region and an outer region of the information recording medium.

3. The information recording and reproducing apparatus as claimed in claim 1, wherein:

when the control unit commands the running power controlling and recording unit to perform the running power control in the entire area of the information recording medium, the control unit controls the interval adjusting unit so that the interval for performing the running power control in the outer region of the information recording medium is smaller than the interval in the inner region thereof.

4. The information recording and reproducing apparatus as claimed in claim 1, wherein:

when the control unit commands the running power controlling and recording unit to perform the running power control in a region of the information recording medium, the control unit controls the interval adjusting unit so that the running power control is performed only in an outer region of the information recording medium.

5. The information recording and reproducing apparatus as claimed in claim 1, wherein:

the conditions for recording the information in the information recording medium are an information recording position, a recording speed, a value corresponding to a reproduced signal, recording quality, and recording time.

* * * * *